United States Patent [19]
Tsuchida et al.

[11] Patent Number: 6,136,360
[45] Date of Patent: Oct. 24, 2000

[54] TWIST-SHAPED PRODUCTS AND METHOD AND APPARATUS FOR MANUFACTURING THE SAME

[75] Inventors: Takamasa Tsuchida; Hiromi Shinohara, both of Utsunomiya, Japan

[73] Assignee: Rheon Automatic Machinery Co., Ltd., Utsunomiya, Japan

[21] Appl. No.: 09/286,368

[22] Filed: Apr. 5, 1999

[51] Int. Cl.[7] .................................. A21D 6/00; A23P 1/00
[52] U.S. Cl. ...................... 426/500; 425/305.1; 425/391; 426/512
[58] Field of Search ..................................... 426/500, 501, 426/512; 425/391, 305.1, 373; 264/339

[56] References Cited

U.S. PATENT DOCUMENTS

| 2,463,112 | 3/1949 | Kipnis | 426/500 |
| 5,637,341 | 6/1997 | Rivlin | 426/500 |

*Primary Examiner*—George C. Yeung
*Attorney, Agent, or Firm*—Limbach & Limbach L.L.P.

[57] ABSTRACT

A method and apparatus for readily mass-producing twist-shaped food products. The method is characterized in that cut V-shaped food materials are formed into twist-shaped products by being passed through a cut-spreading/transport apparatus, a twist-providing apparatus, and roll-pressing plates.

12 Claims, 5 Drawing Sheets

TWIST-SHAPED PRODUCTS AND METHOD AND APPARATUS FOR MANUFACTURING THE SAME

FIELD OF THE INVENTION

This invention relates to a method and apparatus for manufacturing twist-shaped products such as a bun that are obtained by intertwisting given shapes of, e.g., rectangular food materials.

BACKGROUND OF THE INVENTION

As to a method of shaping twist-shaped products such as a doughnut or Danish pastry, several methods are known: wherein food materials cut in a rectangular shape are folded in two after being twisted, and then further intertwisted by hand or one end of each of the three strips of rectangular food materials are united, and then intertwisted in three-strip twines by hand.

In the conventional method, since twist-shaped products were manufactured by shaping food materials piece-by-piece by hand, the mass production of them required much labor.

SUMMARY OF THE INVENTION

This invention aims to provide a method and apparatus for manufacturing twist products that can resolve the problems of the above-mentioned labor in shaping products by hand, and sanitary problems as well.

One embodiment of the invention is a method of manufacturing twist-shaped products wherein one leg of a food material formed in a V-like shape is twisted first, and then the other leg is intertwisted along with the twisted one.

In some embodiment one leg of a food material formed in a V-like shape is twisted from its distal to its proximal ends, and the other leg is intertwisted from its proximal to its distal ends.

In some embodiments, the food materials formed in a V-like shape are disposed on a belt conveyor such that the open parts of the V-like food materials face toward the traveling direction of the belt conveyor, and such that the V-shaped food materials touch both a twist-providing member disposed on the belt conveyor and the belt conveyor so that they pass therebetween to be intertwisted.

In some embodiments, the food materials formed in a V-like shape are provided by cutting a belt-like food material into a rectangular shape. Each piece of the cut rectangular food material has a cut of an appropriate length from one of its sides, and the cut is then appropriately spread.

In some embodiments, a transport means, whose transport speed is higher than that of a first belt conveyor for transporting the rectangular food materials, is disposed adjacent to the first belt conveyor, and the rectangular materials are formed into a V-like shape through the difference in speeds between the first belt conveyor and transport means.

One class of embodiments comprises dough cutter means for cutting a belt-like food dough that is transported on a first belt conveyor into rectangular food materials, and for forming a cut of an appropriate length that extends in a direction orthogonal to the transport direction from one side of the rectangular food material, transport means, whose transport speed is higher than that of the first belt conveyor, disposed adjacent to the first belt conveyor for spreading and forming the cut into a V-like shape, and a twist-providing member for twisting one leg of the spread V-shaped food material from its distal to its proximal ends, and for intertwisting the other leg from its proximal to its distal ends along with the one leg.

In one class of embodiments, the invention is a twist-shaped food product, wherein one leg of a spread V-shaped food material is twisted from its distal to its proximal ends, and the other leg is intertwisted from its proximal end to its distal end along with the one leg.

DETAILED DESCRIPTIONS OF THE PREFERRED EMBODIMENTS

Figure 1:
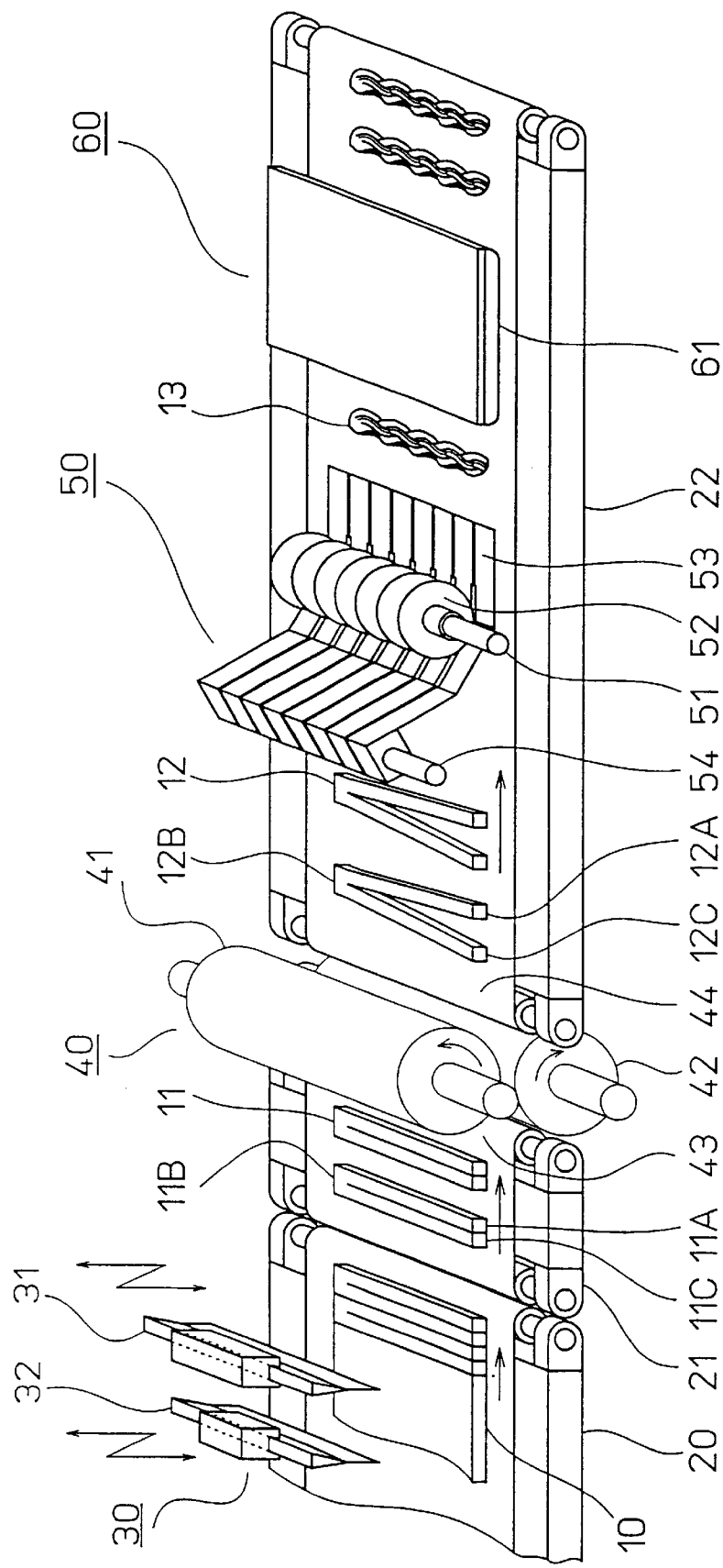
FIG. 1 is a perspective showing the overall processes of manufacturing twist-shaped products.

This invention will now be described by reference to FIG. 1.

Belt conveyors 20, 21, and 22 are disposed side-by-side as transport means from the upstream to downstream positions.

Dough-cutter means is disposed above the belt conveyor 20.

The dough cutter means has a cutter 31 for cutting belt-like food dough 10 into a rectangular shape and a cutter 32 for providing a cut of an appropriate length from one side of the rectangular food material 11.

Transport means 40 is disposed between the belt conveyors 21 and 22 for spreading the cut provided in the rectangular food material 11. The cut-spreading/transport means 40 comprises a set of rollers 41,42 facing each other, the downstream end 43 of the belt conveyor 21, and the upstream end 44 of the belt conveyor 22. The gap between the rollers 41 and 42 is less than that of the thickness of the food material 11.

The speeds of the belt conveyors 20, 21, 22 and rollers 41,42 are set such that they gradually increase from the upstream roller to the downstream one.

A twist-providing member 50 is disposed above the belt conveyor 22. The twist-providing member 50 comprises a plurality of pressing-down disks 52, pivoted on a drive shaft 51, which is disposed parallel to the upper run and orthogonal to the traveling direction of the belt conveyor 22, and plates 53 disposed along the upper run between respective disks 52.

The upstream ends of the plates 53 are pivotally engaged with a supporting shaft 54 such that the plates 53 can move up and down while having their center around the supporting shaft 54 to move up and down between the pressing disks 52.

Rolling means 60 has a roll-pressing plate 61 disposed at a given distance above the upper run of the belt conveyor 22 such that the distance can be adjusted by moving the roll-pressing plate 61 up and down.

The operation of the embodiment of this invention will now be described when a belt-like food dough 10, having a width corresponding to a required length of products, is transported.

The food dough 10 can be used for various cakes such as a croissant, doughnut, Danish pastry, or flour sheet (in which a layer of dough kneaded with chocolate or cream is put in a laminated dough product).

The belt-like dough 10 is cut with cutter means 30 into rectangular food materials 11 having a predetermined thickness. The rectangular food materials 11 are cut at one of its sides so that a cut extends longitudinally from that side toward the other side, leaving a part thereof.

The rectangular food materials 11 cut by the dough cutter means 30 are separated through the difference in transport speeds between the belt conveyors 20,21, so that each of them is passed piece-by-piece to the cut spreading/transport means 40.

The food materials 11 are subject to a pulling force, caused by the difference in transport speeds therebetween, along the traveling direction, both when they pass from the upstream belt conveyor 21 to the cut-spreading/transport means 40 and when they pass from the cut-spreading/transport means 40 to the downstream belt conveyor 22.

The cut or distance between the legs 11A–11B and 11B–11C of the food materials 11 is spread and formed into a V-like shape through the pressing rollers 41,41 of the cut-spreading/transport means 40 and the belt conveyors 21,22.

Figure 2:
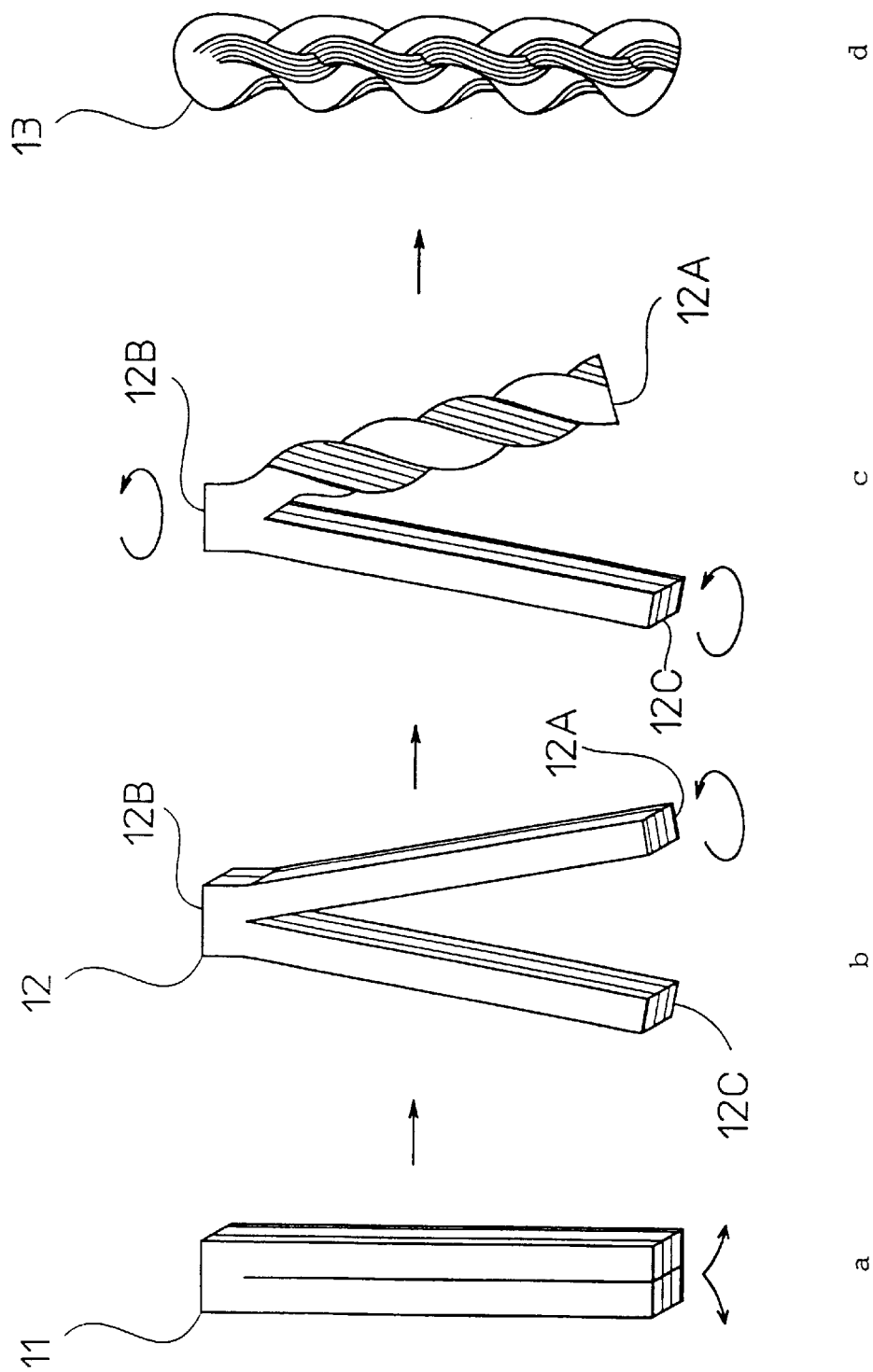
FIG. 2 is a schematic of the twist-formed products of FIG. 1.

When the V-shaped food materials 12 pass through the twist-providing member 50, as shown in FIG. 2-c, the leg 12A of the downstream food material 12 touches the member 50 and begins to be twisted, and then its proximal end 12B is twisted. The twisted leg 12A–12B intertwists with the other leg 12B–12C to form an intertwist product. If the cross section of the legs 12A and 12B is made to be substantially square, they can be easily rotated by the twist-providing member so as to be readily intertwisted.

The intertwisted food material 13 is passed under the roll-pressing plate 61 so that the intertwisted product is roll-tightened to complete the intertwist process.

Figure 3:
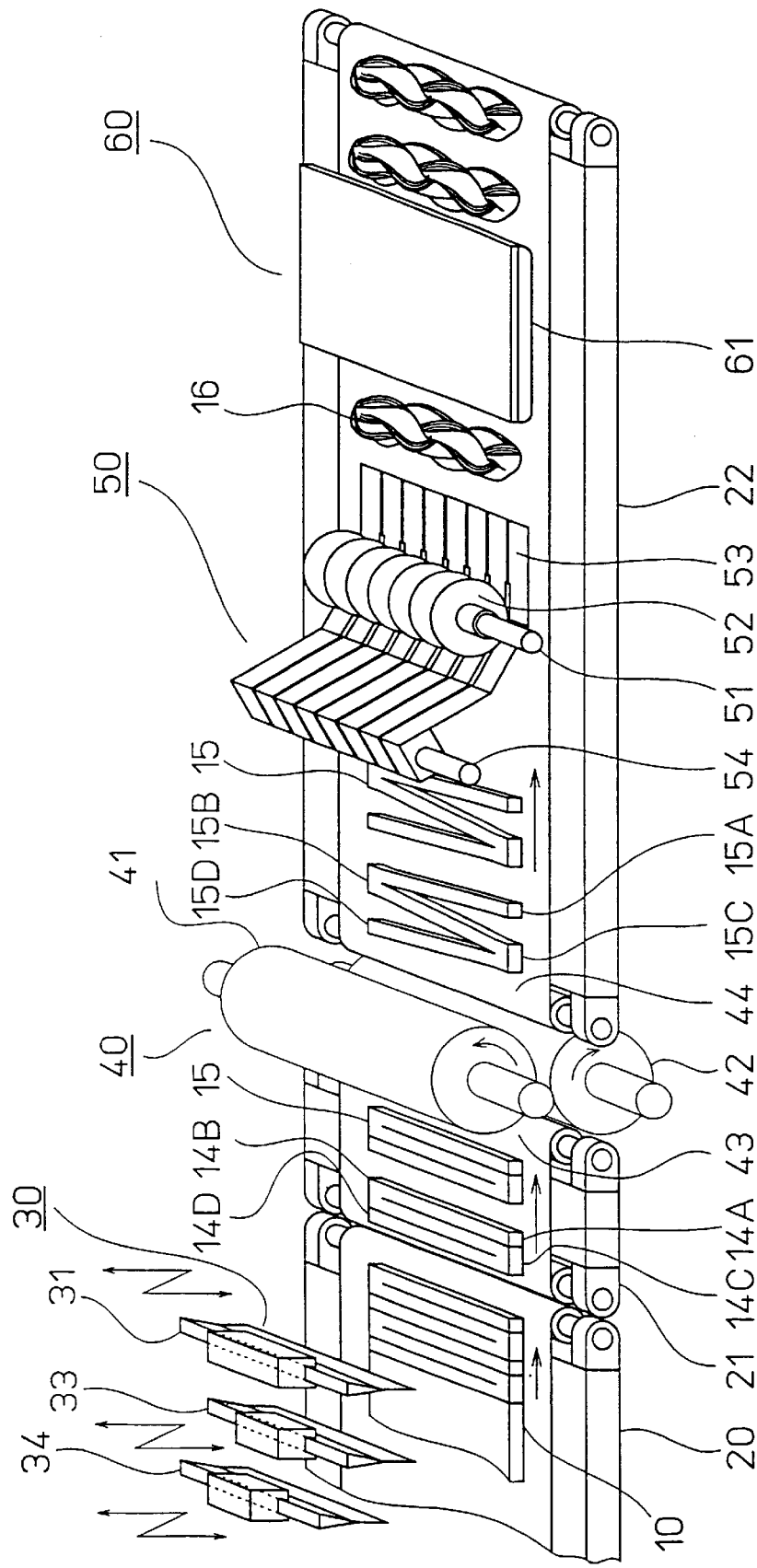
FIG. 3 is a perspective showing the overall processes of manufacturing three-twist-shaped products.

The second embodiment of this invention will now be described by reference to FIG. 3.

In the above-mentioned embodiment two-strip intertwist shaping is carried out, while the second embodiment discloses an apparatus for shaping three-strip twist products. Like elements as in the first embodiment are designated by like reference numbers, and the explanations of them are omitted. In this embodiment a belt-like food dough is also provided. It has the width required for the length of the products to be manufactured. The food dough is cut by dough-cutter means 30 into a rectangular food material 14 having a predetermined width. The food material 14 is cut by cutters 32,33 so that it has two cuts which extend from its shorter sides alternately, leaving their respective uncut portions. In this case one more cut is added, compared to that in the first embodiment wherein a V-shaped material is produced, to provide an N-shaped food material when it is spread out.

Preferably the legs 14A, 14D have a substantially square cross section.

The cut rectangular food material 15 is separated through the difference in speeds between the belt conveyors, and passed to the cut-spreading/transport means 40.

Preferably the separation of the food material 15, bridged by a through cut therebetween, is carried out by using the difference in speeds between the belt conveyors. However, to secure the separation, an additional pressing roller can be used. It can be disposed at the joint between the two belt conveyors, and rotated at the same speed as that of the belt conveyor, so as to sandwich the food material being transported on the belt conveyor therebetween to certainly separate the bridged food material.

Figure 4:
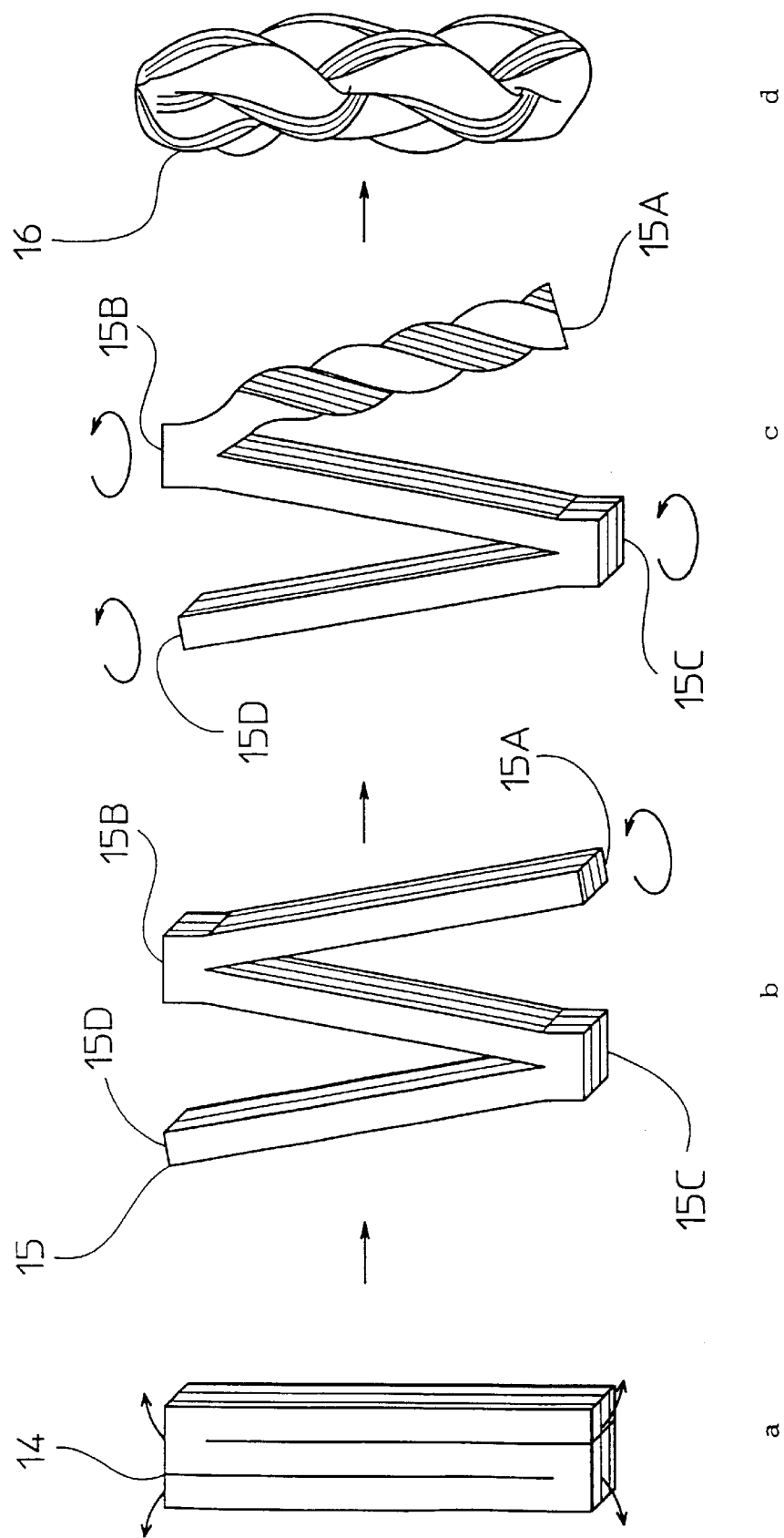
FIG. 4 is a schematic of the three-twist-shaped products of FIG. 3.
Figure 5:
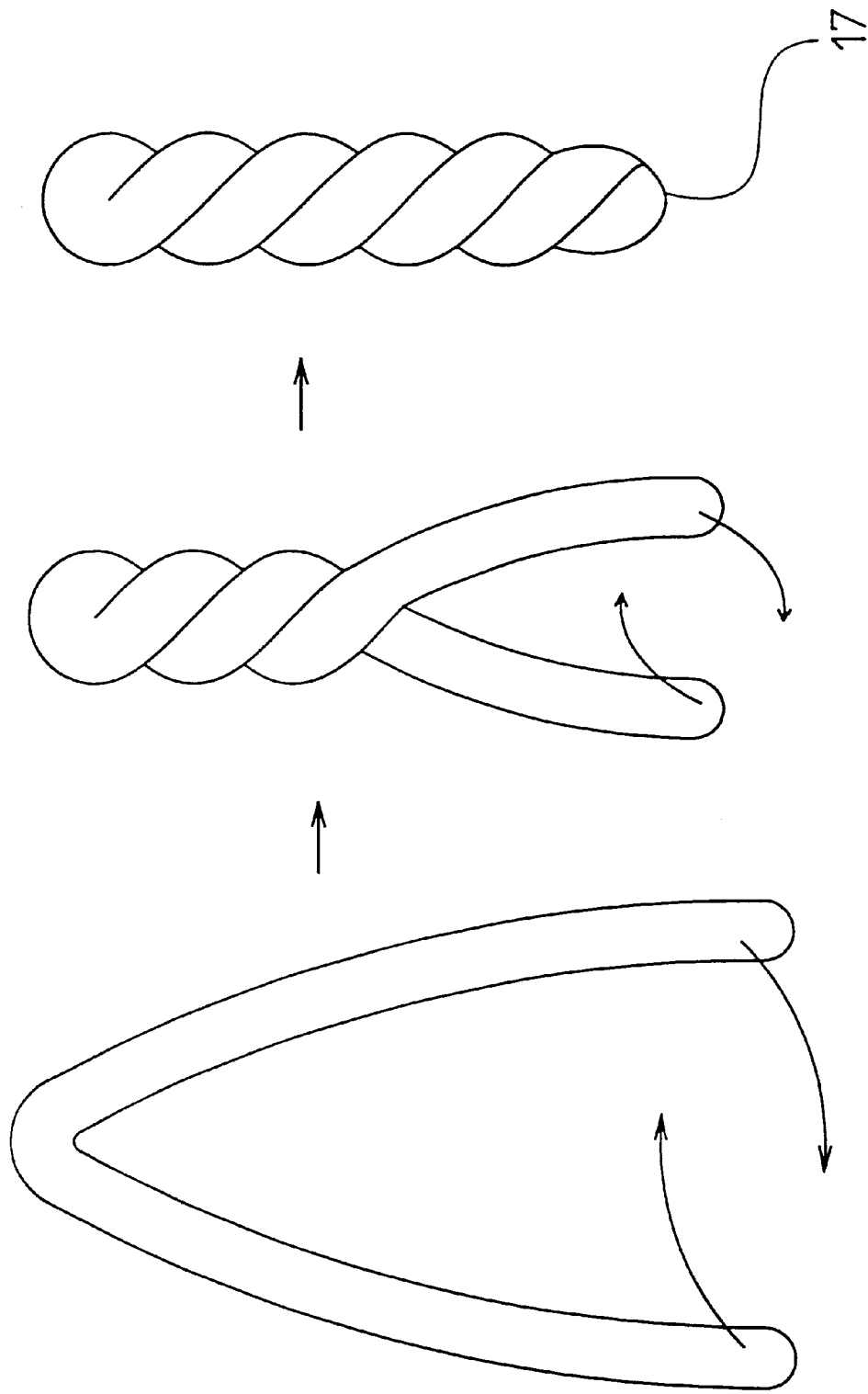
FIG. 5 is a schematic of the conventional twist-shaped products.

After passing through the cut-spreading/transport means, the food material 15 is turned into an N-like shape (FIG. 4-b) by its two central cuts being spread. When the spread N-shaped food material 15 passes through the twine-providing member, it is twist-shaped as follows: As shown in FIG. 4c, the leg 15A of the downstream food material 15 begins to be twisted first; the proximal part 15B of the leg is then twisted; the leg 15B–15C is intertwisted along with the twisted leg 15A–15B; and the leg piece 15C–15D is then intertwisted by the intertwisted legs 15A–15B,15B–15C. Thus, a three-strip twist-shaped product is shaped.

If the cross section of the legs 15A and 15D is made to be substantially square, they can be easily rotated by the twine-providing member so as to be readily intertwisted.

The intertwisted food material 16 is passed under the roll-pressing plate 61 so that the intertwisted product is roll-tightened to complete the intertwist process.

In the above-mentioned second embodiment, spread N-shaped food materials 15 are twist-shaped. However, W-shaped food materials can also be used, which may be prepared by adding one more cut alternately in addition to the two cuts in the materials 15.

Although guillotine-type cutters are shown in the drawings, this invention is not so limited, and any other type of cutter, such as a rotary cutter, may be used. Further, although the twist-providing member 50 comprising the pressing disks 52 and pitching plates 53 is disclosed, this invention is not so limited, and any other type of twist-providing member, e.g., a belt-type of twist-provider, may be used, which is disposed over the transport belt conveyor which travels in a direction opposite the traveling direction of the belt conveyor.

EFFECTS OF THE INVENTION

As can be seen from the above explanations, since the inventive method is a method of manufacturing twist-shaped products by twisting one leg of a food material formed in a V-like shape, and then intertwisting the other leg along with the twisted food material, intertwisted products can be readily produced.

In embodiments in which one leg of a food material formed in a V-like shape is twisted from its distal to its proximal ends, and the other leg is intertwisted from its proximal to its distal ends, intertwisted products can be continuously and readily produced, while the food materials are being transported on a belt conveyor.

In embodiments in which the food materials formed in a V-like shape are disposed on a belt conveyor such that the open parts of the V-like food materials face toward the traveling direction of the belt conveyor, and such that the V-shaped food materials touch both a twist-providing member disposed on the belt conveyor and the belt conveyor so that they pass therebetween to be intertwisted, the mass production of intertwisted products can be realized.

In embodiments in which the food materials formed in a V-like shape are provided by cutting a belt-like food material into a rectangular shape, in that each of the cut rectangular food materials has a cut of an appropriate length from one of its sides, and in that the cut in the one side is appropriately spread, the continuous mass production of twist-shaped products can be produced from belt-like food dough.

In embodiments in which a transport means, whose transport speed is higher than that of a first belt conveyor for transporting the rectangular food materials, is disposed adjacent to the first belt conveyor, and in which the rectangular materials are formed into a V-like shape through the difference in speeds between the first belt conveyor and transport means, the V-shaped food materials can be certainly obtained to provide twists.

In a class of embodiments which the invention is an apparatus comprising dough cutter means for cutting a belt-like food dough transported on a first belt conveyor into rectangular food materials and for forming a cut of an appropriate length that extends in a direction orthogonal to the transport direction from one side of the rectangular food material, transport means, whose transport speed is higher than that of the first belt conveyor, disposed adjacent to the first belt conveyor for spreading and forming the cut into a V-like shape, and twist-providing means for twisting one leg of the spread V-shaped food material from its distal to its proximal ends, and for intertwisting the other leg from its proximal to its distal ends along with the one leg, much labor can be avoided by providing the apparatus for manufacturing twist-shaped products.

As stated above, two- or three-strip twist-shaped products have advantages over the conventional twist-shaped products manufactured by hand in that much less labor is needed, irregularity in a shape of products produced by hand is eliminated, producing ability per hour or productivity is enhanced, and the sanitary problems such as one caused by foreign substances mixed with the products are reduced since manual operations are reduced.

We claim:

1. A method of manufacturing twist-shaped products, comprising the steps of:

first, twisting one leg of a food material that has been formed in a V-like shape, and then, intertwisting the other leg along with the twisted one leg.

2. The method of claim 1, wherein the one leg of a food material formed in a V-like shape is twisted from its distal end to its proximal end, and the other leg is intertwisted from its proximal end to its distal end.

3. The method of claim 1, wherein multiple items of the food material, each formed in a V-like shape, are disposed on a belt conveyor such that the open parts of the V-like food materials face toward the traveling direction of the belt conveyor, and such that each of the items touches both a twist-providing member disposed on the belt conveyor and the belt conveyor so that said each of the items passes therebetween to be intertwisted.

4. The method of claim 2, wherein multiple items of the food material, each formed in a V-like shape, are disposed on a belt conveyor such that the open parts of the V-like food materials face toward the traveling direction of the belt conveyor, and such that each of the items touches both a twist-providing member disposed on the belt conveyor and the belt conveyor so that said each of the items passes therebetween to be intertwisted.

5. The method of claim 1, wherein the food material formed in a V-like shape is provided by cutting a belt-like food material into a rectangular shape, each of the cut rectangular food material having a cut of an appropriate length from one of its sides, and the cut in the one side is appropriately spread.

6. The method of claim 2, wherein the food material formed in a V-like shape is provided by cutting a belt-like food material into a rectangular shape, each of the cut rectangular food material having a cut of an appropriate length from one of its sides, and the cut in the one side is appropriately spread.

7. The method of claim 3, wherein characterized in that the food materials formed in a V-like shape are provided by cutting a belt-like food material into a rectangular shape, each of the cut rectangular food material has a cut of an appropriate length from one of its sides, and the cut in the one side is appropriately spread.

8. The method of claim 7, wherein a transport means, whose transport speed is higher than that of a first belt conveyor for transporting each said rectangular food material, is disposed adjacent to the first belt conveyor, and each said rectangular material is formed into a V-like shape through the difference in speeds between the first belt conveyor and transport means.

9. The method of claim 6, wherein a transport means, whose transport speed is higher than that of a first belt conveyor for transporting each said rectangular food material, is disposed adjacent to the first belt conveyor, and each said rectangular material is formed into a V-like shape through the difference in speeds between the first belt conveyor and transport means.

10. The method of claim 5, wherein a transport means, whose transport speed is higher than that of a first belt conveyor for transporting each said rectangular food material, is disposed adjacent to the first belt conveyor, and each said rectangular material is formed into a V-like shape through the difference in speeds between the first belt conveyor and transport means.

11. A twist-shaped food product, formed by a process comprising the steps of:

twisting one leg of a spread V-shaped food material from its distal end to its proximal end, and intertwisting another leg of the V-shaped food material from its proximal end to its distal end along with the one leg.

12. An apparatus for manufacturing twist-shaped food products comprising dough cutter means for cutting a belt-like food dough transported on a belt conveyor into rectangular food materials, and for forming a cut of an appropriate length that extends in a direction orthogonal to the transport direction from one side of the rectangular food material, cut-spreading/transport means, whose transport speed is higher than that of the belt conveyor, disposed adjacent to the belt conveyor for spreading and forming the cut into a V-like shape, and twist-providing means for twisting one leg of the spread V-shaped food material from its distal to its proximal ends, and for intertwisting the other leg from its proximal to its distal ends along with the one leg.

* * * * *